United States Patent
Gentry et al.

(10) Patent No.: US 10,363,493 B1
(45) Date of Patent: *Jul. 30, 2019

(54) WASTEWATER EVAPORATION APPARATUS AND SYSTEM

(71) Applicants: Kevin G. Gentry, Oklahoma City, OK (US); Devon S. Dupree, Butler, OK (US); John W. Moore, III, Oklahoma City, OK (US)

(72) Inventors: Kevin G. Gentry, Oklahoma City, OK (US); Devon S. Dupree, Butler, OK (US); John W. Moore, III, Oklahoma City, OK (US)

(73) Assignee: Logic Energy Solutions LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,133

(22) Filed: Jun. 18, 2018

Related U.S. Application Data

(63) Continuation of application No. 15/234,832, filed on Aug. 11, 2016, now Pat. No. 10,022,647.

(51) Int. Cl.
| | | |
|---|---|---|
| *B01D 1/14* | (2006.01) | |
| *C02F 1/04* | (2006.01) | |
| *C02F 1/16* | (2006.01) | |
| *B01D 1/00* | (2006.01) | |
| *C02F 1/20* | (2006.01) | |
| *C02F 1/10* | (2006.01) | |
| *C02F 101/32* | (2006.01) | |

(52) U.S. Cl.
CPC .............. *B01D 1/14* (2013.01); *B01D 1/0041* (2013.01); *B01D 1/0058* (2013.01); *B01D 1/0064* (2013.01); *C02F 1/043* (2013.01); *C02F 1/048* (2013.01); *C02F 1/10* (2013.01); *C02F 1/16* (2013.01); *C02F 1/20* (2013.01); *C02F 2101/32* (2013.01)

(58) Field of Classification Search
CPC .. B01D 1/0041; B01D 1/0058; B01D 1/0064; B01D 1/14; C02F 1/04; C02F 1/043; C02F 1/048; C02F 1/16
See application file for complete search history.

(56) References Cited

U.S. PATENT DOCUMENTS

| | | | |
|---|---|---|---|
| 7,214,290 B2* | 5/2007 | Duesel, Jr. ........... | B01D 1/0058 159/16.2 |
| 2011/0303368 A1* | 12/2011 | Panz ...................... | B01D 1/14 159/16.2 |

* cited by examiner

*Primary Examiner* — Renee Robinson
(74) *Attorney, Agent, or Firm* — Phillips Murrah PC; Martin G. Ozinga

(57) ABSTRACT

The present invention comprises an evaporation system for wastewater wherein the staging tank is utilized to pretreat the wastewater to strip hydrocarbons from the staging tank before sending to the evaporator by sparging the wastewater in staging tank with air from the blower and or hot gases from the combustion utilized in the evaporation system.

1 Claim, 1 Drawing Sheet

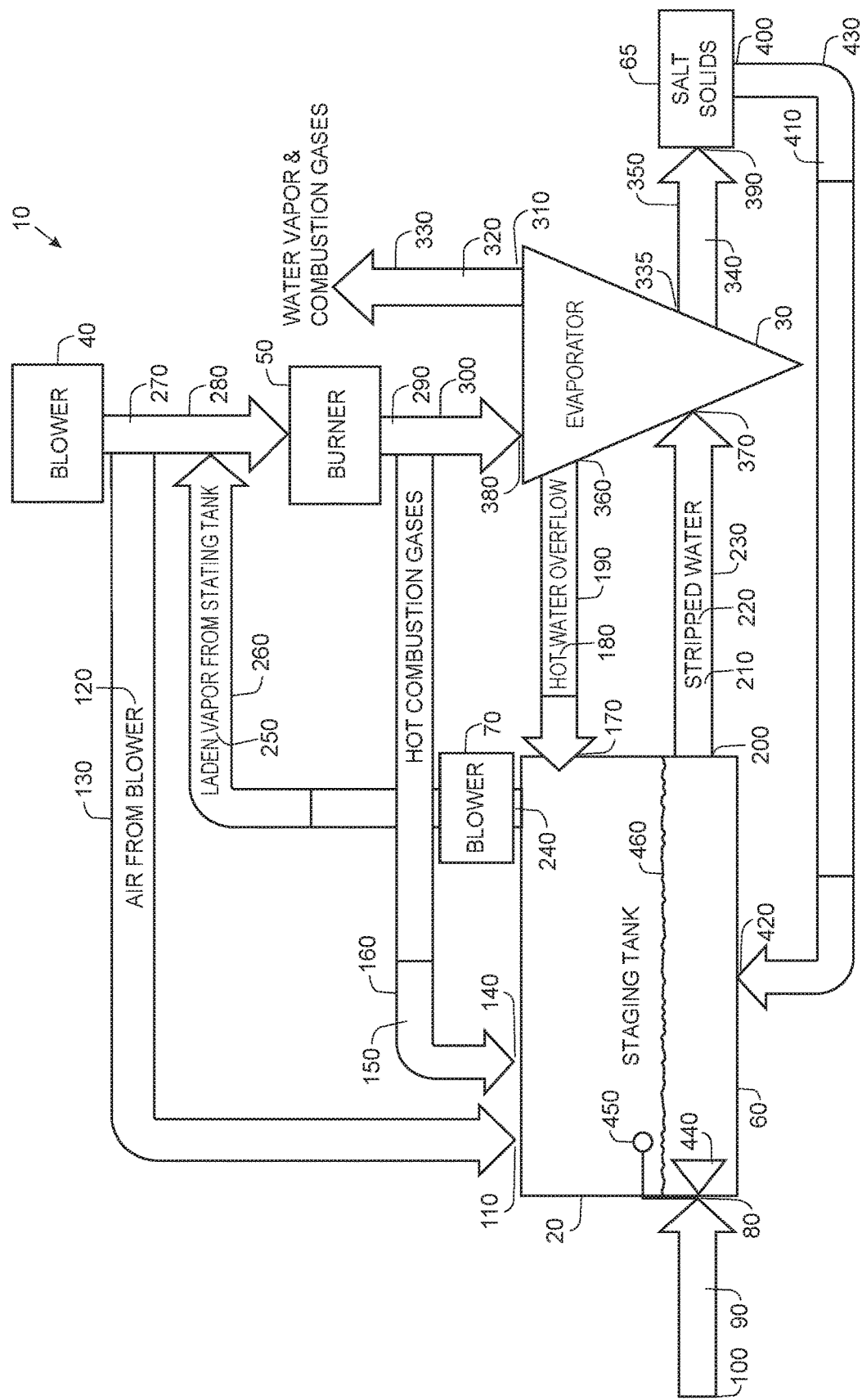

WASTEWATER EVAPORATION APPARATUS AND SYSTEM

BACKGROUND OF THE INVENTION

1. Field of the Invention

In general, the present invention relates to an apparatus, system and method for disposing of contaminated wastewater. More particularly, the present invention provides an evaporation system for wastewater utilizing a staging tank where the staging tank is sparged by air from the blower of the evaporator system to strip hydrocarbons from the wastewater and then pumping these stripped hydrocarbons into the combustion process, flare, hydrocarbon filter, carbon filter, and or combinations thereof.

2. Description of the Prior Art

It is known to treat the wastewater for general reuse and return to the environment although the amount of wastewater to be treated and cost of treating can be prohibitive. It is also known to evaporate the wastewater or large percentage of such thereby reducing the amount of water left to be treated and or returned to the environment. Evaporation is often preferred because of its generally light footprint on the environment when emissions are controlled and the operation cost of the massive evaporation is not prohibitive.

Submerged combustion heating is generally a method whereby hot products of combustion are forced through a liquid or liquid-solid mixture to heat the liquid or liquid-solid mixture. An advantage of this heating system is that the heat exchange occurs directly between the hot gaseous products of combustion and the liquid. In a submerged combustion system, the hot combustion is typically fueled by a combination of air and natural gas. Another benefit of such application is the natural gas needed to fuel the evaporation may come from the well operation thereby eliminating the need for transporting a fuel.

The operational benefits of evaporation are reduced handling of the contaminated water, which may streamline the entire operation; fewer trucks needed to move the wastewater mean less site damage, maintenance and general reduced liability; and overall, less dependence on water haulers eliminates scheduling delays and fees. The environmental benefits include less CO2 emissions as the need for trucks is reduced and or eliminated as well as less road damage and noise associated with fewer trucks. Other benefits may be reduced flaring, improved public perception of evaporation versus injection, and less likelihood of spills or surface water contamination.

Evaporation systems, typically, comprise a staging tank that accepts the wastewater before sending to the evaporator. Large scale evaporation of significant amounts of wastewater does create challenges. It is, therefore, desirable to provide a pretreatment process to wastewater before evaporation means from water evaporation systems such as but not limited to submerged combustion applications. The balance of cost, time, and operational efficiency has created a need for new and improved pretreatment for wastewater before entering evaporation. The above discussed limitations in the prior art is not exhaustive. Thus, there is a need for an apparatus, method and system to provide a new and improved evaporation system that maximizes efficiency and is environmentally friendly. The current invention provides an inexpensive, time saving, more reliable apparatus, system and method where the prior art fails.

SUMMARY OF THE INVENTION

In view of the foregoing disadvantages inherent in the known types of wastewater treatment associated with well operations now present in the prior art, the present invention provides a new and improved wastewater evaporation apparatus, system and method of use. As such, the general purpose of the present invention, which will be described subsequently in greater detail, is to provide a new and improved wastewater evaporation application, which has all the advantages of the prior art devices and none of the disadvantages.

To attain this, the present invention essentially comprises an evaporation system for contaminated water and or wastewater wherein the staging tank is utilized to pretreat the wastewater to strip hydrocarbons from the staging tank before sending to the evaporator by sparging the wastewater in staging tank with air from the blower and or utilizing a heat boost from the burner utilized in the evaporation system. The current invention may be utilized in fracking operations, well production in general, drilling operations, permanent placement at the well, and may be utilized in other applications where it is desirable to separate solids from liquids via evaporation and or evaporation in general other than oil and gas applications.

The term "sparging" generally refers to taking air from the blower and or hot air combustion gases from the evaporation system and introducing it into the staging tank whereby wastewater may have its hydrocarbons released by agitating the wastewater, which thereby releases trapped gas in the wastewater. Invention 10 also contemplates that the sparging process may also function to preheat the wastewater before entering evaporation system, which may increase the temperature to around but not limited to 150 to 160 degrees Fahrenheit.

It is also understood that in biochemical engineering, sparging can also be a method to remove low-boiling liquids from a solution. The low-boiling components tend to evaporate more rapidly, hence they may be removed from the bulk solution containing higher-boiling components.

Invention 10 also contemplates volatilizing contaminant. Vapor extracting system refers to the use of a vacuum pump or blower that uses slight vacuum to remove the vapors from the headspace of the staging tank and transfer them to the combustion or treatment process. During air sparging, direct volatilization of the absorbed and trapped contaminants is enhanced in the zones where airflow takes place. Direct volatilization of any compound is governed by its vapor pressure, and most volatile organic compounds (VOCs) are easily removed through volatilization.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved wastewater evaporation application with a pretreatment operation at the staging tank and method of using the same, which may sparge the wastewater in the staging tank thereby releasing hydrocarbons, which may then be supplied to the burner and then pumping these stripped hydrocarbons into the combustion process, flare, hydrocarbon filter, carbon filter, and or combinations thereof.

It is a further object of the present invention to provide a new and improved wastewater evaporation application and method, which is of a durable and reliable construction and may be utilized with oil and gas operations in general, multiple wells and or single well sites, pipelines, and so forth.

It is still a further object of the present invention to provide a new and improved wastewater evaporation application and method, which is of a durable and reliable construction and may be utilized to dispose of contaminated water in other applications not associated with oil and gas operations such as but not limited to leachate from landfills, mining operations, environmental disasters such as flooding, and so forth.

An even further object of the present invention is to provide a new and improved wastewater evaporation application and method, which is susceptible to a low cost of manufacture with regard to both materials and labor, and which accordingly is then susceptible to low prices of sale to the consuming industry, thereby making such tool economically available to those in the field.

Still another object of the present invention is to provide a new and improved wastewater evaporation application and method, which provides all of the advantages of the prior art, while simultaneously overcoming some of the disadvantages normally associated therewith.

Another object of the present invention is to provide a new and improved wastewater evaporation application and method, which maximizes evaporation of water and concentrates solids for disposal.

An object of the present invention is to provide a new and improved wastewater evaporation application and method, which maximizes evaporation of water and concentrates solids such as but not limited to salt creating brine, which may be utilized in other applications. Yet another object of the present invention is to provide a new and improved wastewater evaporation application and method that may be generally portable and or mobile and moved from site to site with existing transportation equipment.

An even further object of the present invention is to provide a new and improved wastewater evaporation application and method, which improves the evaporation process in general and is also environmentally friendly.

Still another object of the present invention is to provide a new and improved wastewater evaporation application and method, which reduces risky, high-cost handling; increases production through shut-down avoidance; and improves cost management predictability.

Yet still another object of the present invention is to provide a new and improved wastewater evaporation application and method, which may be utilized in aspects of oil and gas operations as well as other applications where it is desirable to remove solids from wastewater or water in general.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices wherein:

FIG. 1 is a general illustration of a preferred embodiment of the invention depicting a schematic view.

DETAILED DESCRIPTION OF THE PREFERRED EMBODIMENTS

Referring to the illustrations and to FIG. 1 in particular, reference character 10 generally designates a new and improved apparatus, system, and method of using same constructed in accordance with the present invention. Invention 10 is generally used with a well utilized for the retrieval of hydrocarbons below the surface and the treatment of wastewater from same. It is understood that invention 10 may be utilized in numerous other applications where it is desirable to treat wastewater and or contaminated water in general and the current invention should not be considered limited to just oil and gas applications. Furthermore, it is also to be understood that the current invention may be used for treating waste water from oil and gas producing wells as well as from drilling, from drilling operations, fracking operations, midstream applications, pipelines in general, combinations thereof and so forth.

Invention 10 may be utilized in other applications where it is desirable to dispose of contaminated water such as run off and or leachate from landfills, mining operations, natural disasters such as flooding where large amounts of water get contaminated from overflown sewage, and so forth. Invention 10 may be utilized to concentrate salt into a desirable brine, which may be utilized in other applications.

Invention 10 may generally include an evaporator system 20 with an evaporator 30, a blower 40, a burner 50, a staging tank 60, a containment tank 65, a staging tank blower 70 and so forth. It is understood that an evaporator system 20 may include other features such as but not limited to a solids container where solids from the evaporation system 20 are ultimately deposited for disposal.

Evaporator system 20 may utilize submerged combustion heating although the invention contemplates other types of known evaporation systems. Submerged combustion heating is generally a method whereby hot products of combustion are forced through a liquid or liquid-solid mixture to heat the liquid or liquid-solid mixture. An advantage of this heating system is that the heat exchange occurs directly between the hot gaseous products of combustion and the liquid. In a submerged combustion system, the hot combustion is typically fueled by a combination of air and natural gas. Another benefit of such application is the natural gas needed to fuel the evaporation may come from the well operation thereby eliminating the need for transporting a fuel.

Staging tank 60 may include a first inlet 80 for receiving hydrocarbon laden, wastewater, and or contaminated water 90, in general, via a first conduit 100, a second inlet 110 for receiving air 120 from blower 40 via a second conduit 130, a third inlet 140 for receiving hot combustion gases 150 from burner 50 via third conduit 160, and a fourth inlet 170 for receiving hot water overflow 180 from evaporator 30 via fourth conduit 190.

It is understood that sparging may occur from air 120 from blower 40 mixing in staging tank 60. Invention 10 also contemplates that air 120 from blower 40 may be forced air as opposed to natural draft air. It is also contemplated that the sparging process may benefit from a heat boost from hot combustion gases 150 from burner 50. It is also contemplated that invention 10 may increase waste water 90 in staging tank 60 temperature to about 150-160 degrees Fahrenheit which may increase and or improve the evaporation process. It is understood that more and or less temperature is contemplated. It is also understood that invention 10 may utilize blower 40 of evaporator 30 as described above but may also utilize another separate blower 40 not associated with evaporator 30.

Invention 10 also contemplates an increased retention time of waste water 90 in staging tank 60, which may allow for more hydrocarbons to be stripped before exiting staging tank 60. Retention time may be but is not limited to 7-20 minutes although more and or less time is contemplated.

Staging tank 60 may include a first outlet 200 for passing stripped water 210 still having contaminants 220 to evaporator 30 via fifth conduit 230. Staging tank 60 may also include a second outlet 240 leading to and or communicating with staging tank blower 70, which may then pass hydrocarbon laden vapor 250 from staging tank 60 to burner 50 via sixth conduit 260. Invention 10 contemplates light end hydrocarbons may be turned into vapor.

It is understood that blower 40 provides air 270 to burner 50 via conduit 280. It is contemplated that blower 40 may provide air 120 to staging tank 60 via conduit 280 being connected to staging tank 60 second conduit 130. It is also contemplated that staging tank 60 may provide hydrocarbon laden vapor 250 from second outlet 240 via sixth conduit 260 being connected to conduit 280.

Evaporator 30 may have many inlets and outlets. In a preferred embodiment burner 50 provides heat 290 to evaporator 30 via conduit 300. It is understood that conduit 300 may connect with staging tank 60 third conduit 160. Evaporator 30 may have a first outlet 310 for passing water vapor and combustion gases 320 via first conduit 330. Evaporator 30 may have a second outlet 335 for passing salt solids 340 via second conduit 350. It is understood that other solids may be passed other than salt solids 340. Evaporator 30 may have a third outlet 360 for passing hot water overflow 180 to staging tank 60 via fourth conduit 190. It is understood that evaporator 30 may have a first inlet 370 for receiving stripped water 210 from staging tank 60 via fifth conduit 230 and a second inlet 380 for receiving heat 290 from burner 50 via conduit 300.

Invention 10 contemplates that containment tank 65 may have an inlet 390 and an outlet 400 for passing free liquid 410 back to staging tank 60 fifth inlet 420 via conduit 430. Containment tank 65 may include other features not depicted such as other outlets, inlets, transportation mechanisms and so forth.

In a preferred embodiment, invention 10 may be a perpetual system wherein there may be a constant flow from staging tank 60 and just one actual water level control valve 440 from first inlet 80 during the flow process. Invention 10 also contemplates that staging tank 60 may utilize a mechanical float 450 for wastewater level 460 control. Mechanical float 450 may be non-mechanical and or utilized to shut and or open level control valve 440. It is understood that other known methods of water level control are contemplated.

Changes may be made in the combinations, operations, and arrangements of the various parts and elements described herein without departing from the spirit and scope of the invention. Furthermore, names, titles, headings and general division of the aforementioned are provided for convenience and therefore, should not be considered limiting.

What is claimed is:

1. A wastewater evaporation system comprising:
an evaporator system having a first blower adapted to blow air, a burner adapted to produce hot combustion gases, and an evaporator adapted to produce solids from wastewater wherein said blower is connected to said burner by providing air thereto and said burner is connected to said evaporator by providing hot combustion gases thereto and wherein said evaporator includes a first outlet for passing water vapor and combustion gases out of said evaporator via a conduit;
a containment tank for receiving said solids and unevaporated portion of said wastewater from said evaporator;
a staging tank having a first inlet for receiving said wastewater, a second inlet to receive said air from said first blower to sparge said wastewater, a third inlet to receive said hot combustion gases from said burner to heat said wastewater, a fourth inlet to receive hot water overflow from said evaporator, a fifth inlet adapted to receive free water from said containment tank, a first outlet for sending stripped water to said evaporator, and a second outlet having a second blower for sending laden vapor from said staging tank.

* * * * *